(12) United States Patent
Thurlow

(10) Patent No.: US 9,162,604 B2
(45) Date of Patent: Oct. 20, 2015

(54) CARGO STRAP FASTENER

(71) Applicant: Micah L. Thurlow, Bedford, TX (US)

(72) Inventor: Micah L. Thurlow, Bedford, TX (US)

(*) Notice: Subject to any disclaimer, the term of this patent is extended or adjusted under 35 U.S.C. 154(b) by 43 days.

(21) Appl. No.: 14/147,807

(22) Filed: Jan. 6, 2014

(65) Prior Publication Data

US 2014/0250644 A1     Sep. 11, 2014

Related U.S. Application Data

(60) Provisional application No. 61/775,042, filed on Mar. 8, 2013, provisional application No. 61/856,813, filed on Jul. 22, 2013.

(51) Int. Cl.
| | | |
|---|---|---|
| *F16G 11/04* | (2006.01) | |
| *F16G 11/14* | (2006.01) | |
| *B60P 7/08* | (2006.01) | |

(52) U.S. Cl.
CPC ............. *B60P 7/0823* (2013.01); *F16G 11/04* (2013.01); *F16G 11/14* (2013.01); *Y10T 24/2121* (2015.01); *Y10T 24/3916* (2015.01)

(58) Field of Classification Search
CPC ......... F16G 11/00; F16G 11/12; D06F 53/04; A43B 23/24; A43B 3/0078; A43C 7/00; B60P 7/0823; B65D 33/1625; B65H 2701/31; B65H 2701/34; B65H 57/16; B65H 75/06; E06B 9/324; E06B 9/326
USPC .............................. 24/69 CT, 129 R, 130, 302
See application file for complete search history.

(56) References Cited

U.S. PATENT DOCUMENTS

| | | | | |
|---|---|---|---|---|
| 1,225,623 | A | | 5/1917 | Hall et al. |
| 2,316,950 | A | | 4/1943 | Goeller |
| 2,533,341 | A | * | 12/1950 | Alfano ........................ 242/388 |
| 3,626,495 | A | * | 12/1971 | Bastian, Jr. ................ 242/405.2 |
| 4,188,435 | A | * | 2/1980 | Bartrug ......................... 428/167 |
| 4,355,444 | A | * | 10/1982 | Haney ......................... 24/129 B |
| 4,639,977 | A | * | 2/1987 | Howard ......................... 24/16 R |
| 5,232,193 | A | * | 8/1993 | Skakoon .......................... 251/4 |
| 5,473,796 | A | * | 12/1995 | Fusillo ....................... 24/30.5 R |
| 5,979,028 | A | * | 11/1999 | Hicks et al. .................... 24/712.9 |
| 6,389,652 | B1 | * | 5/2002 | Williams ................... 24/30.5 R |
| 6,571,854 | B1 | * | 6/2003 | Palmer et al. .............. 160/178.2 |
| 2004/0231112 | A1 | * | 11/2004 | Marcaccio et al. ......... 24/129 R |
| 2004/0237264 | A1 | | 12/2004 | Shaw |
| 2007/0180665 | A1 | | 8/2007 | Sween et al. |
| 2008/0189917 | A1 | | 8/2008 | Maley |

OTHER PUBLICATIONS

International Search Report and Written Opinion for PCT Appl. No. PCT/US2014/021855 dated Jun. 27, 2014 (8 pages).

* cited by examiner

*Primary Examiner* — Robert J Sandy
*Assistant Examiner* — David Upchurch
(74) *Attorney, Agent, or Firm* — Wei Wei Jeang; Grable Martin Fulton PLLC

(57) ABSTRACT

A fastener operable to fasten to a strap having a tensioned segment and a loose segment includes a planar profile having at least two sides defining an elongated wrap section configured for having the loose segment of the strap wrapped around it, and at least one slot configured to clip onto the tensioned segment of the strap, and retain the loose segment of the strap wrapped around the elongated wrap section against the tensioned segment of the strap.

18 Claims, 8 Drawing Sheets

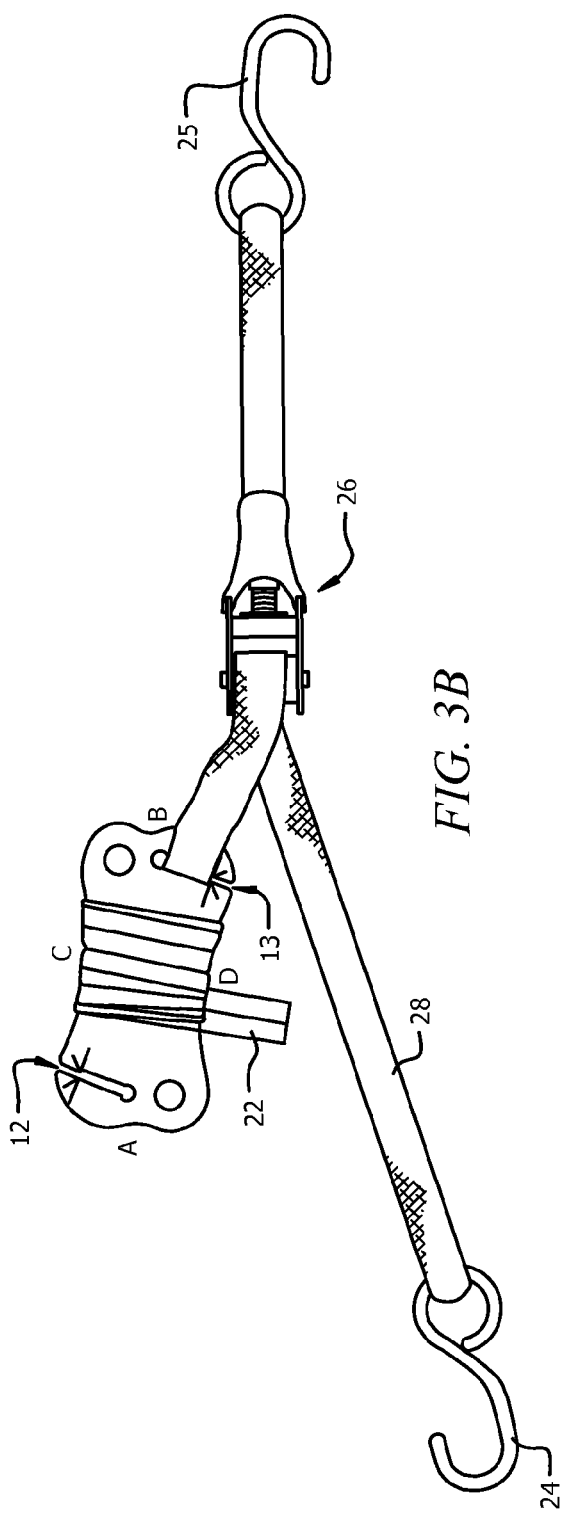
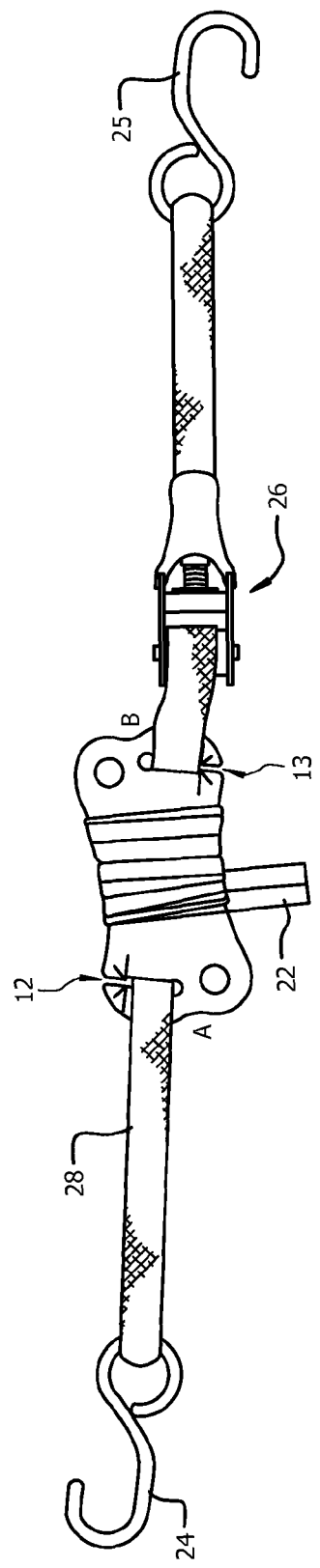
FIG. 3B
FIG. 3C

CARGO STRAP FASTENER

RELATED APPLICATIONS

This application claims the benefit U.S. Provisional Patent Application Ser. Nos. and 61/775,042 and 61/856,813 filed on Mar. 8, 2013 and Jul. 22, 2013, respectively.

FIELD

The present disclosure primarily relates to a fastener for a webbing strap also called a cargo strap.

BACKGROUND

Tie-down straps or cargo straps are commonly used in the course of farm work, hunting, recreation, and transporting cargo, equipment, and materials, for example. These cargo straps are generally made of a flat webbing and typically used with hooks on the two ends with a ratcheting or locking mechanism. The cargo straps are typically made of a woven lightweight, flexible, and high tensile strength material. These cargo straps are commonly used to secure articles and items in or on trailers, pickup trucks, vehicles, platforms, etc. After the articles are secured there is always an excess length of the webbing strap that should be secured so it doesn't whip around in the wind during transit, damage adjacent items, or become a trip hazard. Conventionally, users often leave the strap end loose, or tie the strap in sloppy and haphazard knots.

DESCRIPTION OF THE DRAWINGS

FIGS. 3A-3D are a sequence of views illustrating how the cargo strap fastener can be used to tie down a loose end of a strap according to the teachings of the present disclosure.

DETAILED DESCRIPTION

Figure 1:
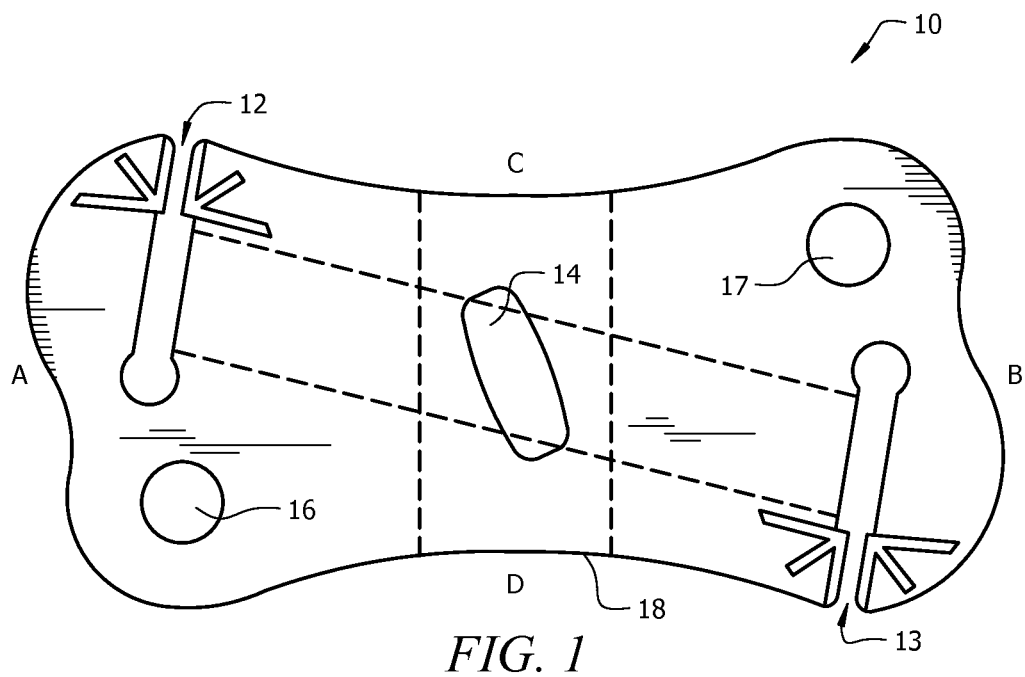
FIG. 1 is a top plan view of an exemplary embodiment of a cargo strap fastener according to the teachings of the present disclosure.
Figure 2:
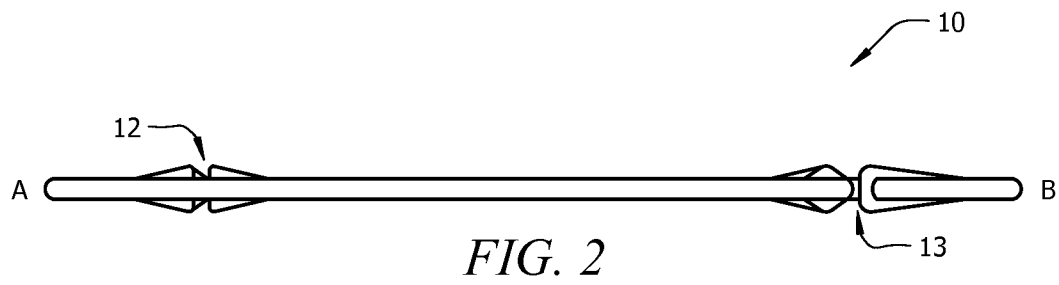
FIG. 2 is a side view of an exemplary embodiment of a cargo strap fastener according to the teachings of the present disclosure.

FIGS. 1 and 2 are top plan view and side view of an exemplary embodiment of a cargo strap fastener 10 according to the teachings of the present disclosure. The fastener 10 is a generally planar elongated device that has a generally rectangular shape with a longitudinal axis having sides A-D, where A and B designate the two shorter sides on either side of the longitudinal axis, and C and D designate the two longer sides along the longitudinal axis. The fastener device 10 can be constructed from any material that is suitably rigid, stiff, and sturdy to retain and secure the free end of the strap to the tensioned portion of the cargo strap. Exemplary materials include metals, plastics, graphite, and composites of suitable materials. The fastener 10 preferably includes two opposing narrow slots 12 and 13 on the longer opposing sides C and D. As shown in FIG. 1, the fastener 10 is further contoured to define a thicker and narrower entrance to the slots 12 and 13. As a result, the narrower opening to the slots 12 and 13 helps to retain the cargo strap within the slots during use. An elongated opening 14 is located near the center of the fastener 10 and is configured to receive the loose end of the cargo strap.

Further, the fastener 10 incorporates one or more openings 16 and 17 to facilitate easy and neat storage and organization by hanging on hooks or pegs. The fastener 10 may incorporate one or more such openings which also provide the added benefit of weight and material reduction and savings. The holes or openings 16 and 17 are shown to be round but may be of any desirable shape. The one or more openings are designed to have the size and shape that provide the weight and material savings and yet maintains the integrity of the fastener.

In this first embodiment, the cargo strap fastener 10 has a generally flat or planar body with a top surface and a bottom surface. The exemplary device in FIG. 1 has a contoured outline where sides C and D form a generally elongated wrap section 18 (shown in dashed lines) used to wrap the loose end of the cargo strap after the loose end is first inserted through the central opening 14. The slots 12 and 13 are used to clip or secure onto a tensioned segment of the strap and "tie-down" the loose end. A generally elongated fasten section 20 (shown in dashed lines) is illustrated in FIG. 1 to indicate the position of the tensioned portion of the strap on the fastener 10. Accordingly, as shown in FIG. 1, the elongated wrap section 18 and elongated fasten section 20 are in a generally crosswise configuration in this embodiment. In this embodiment, the outline of the fastener is reminiscent of a dog chew bone, however the fastener may be configured to have other shapes and contours.

Figure 3A:
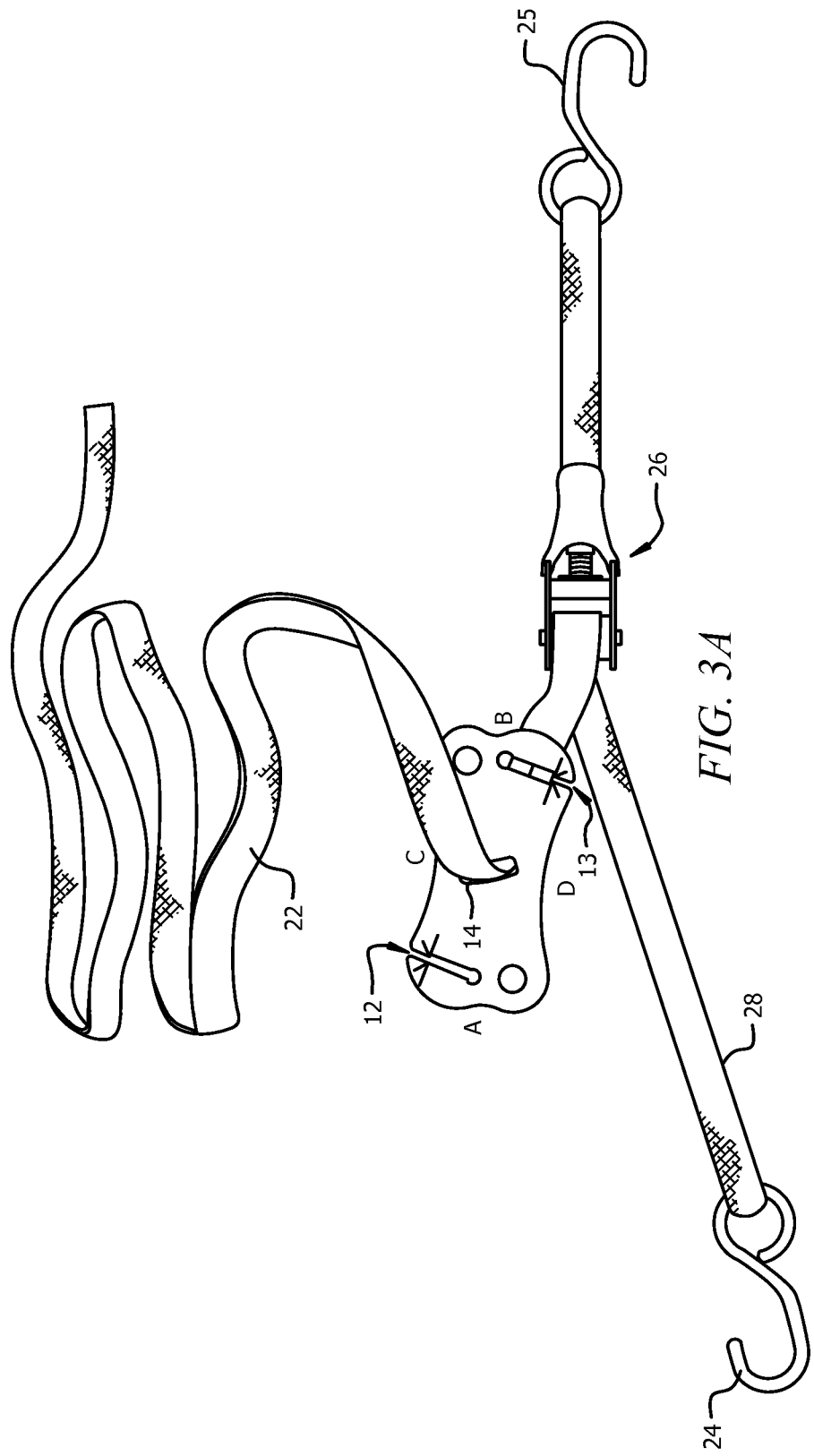
Figure 3D:
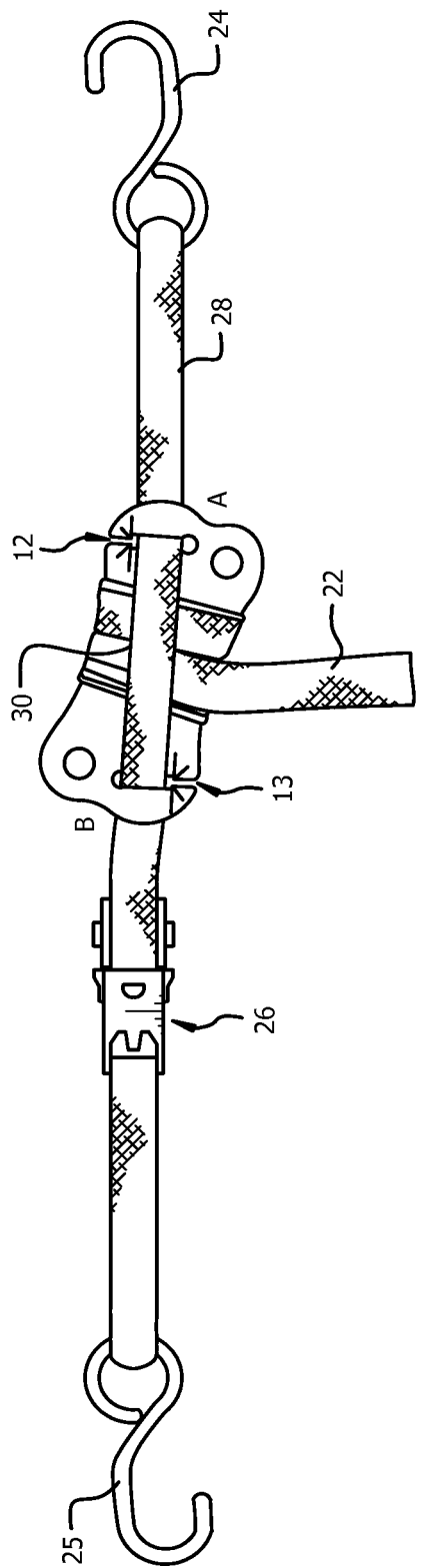
Figure 4:
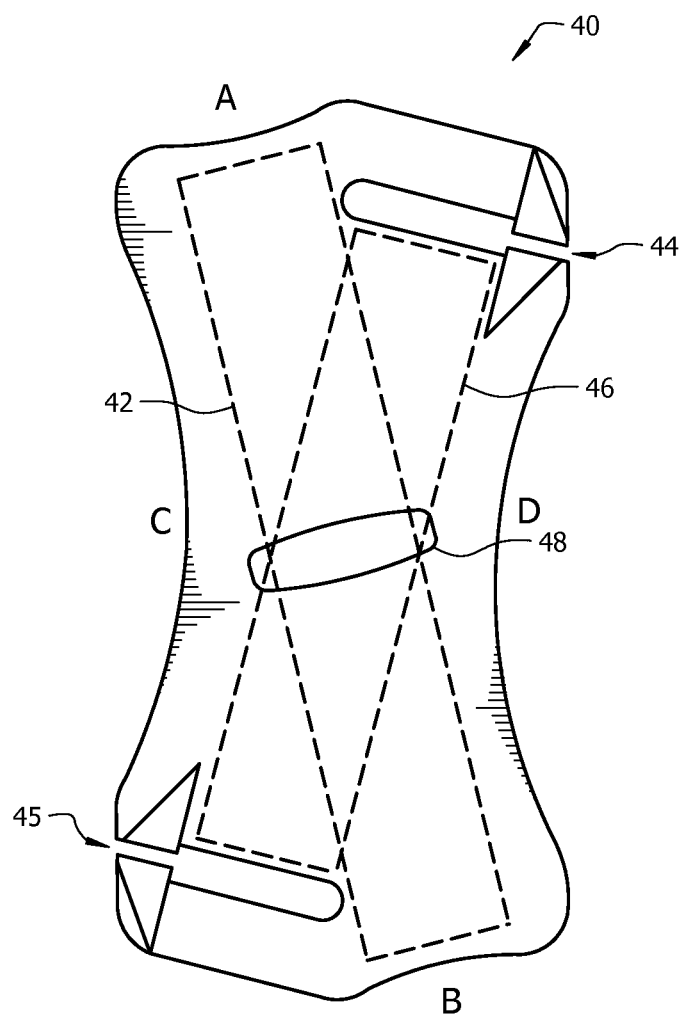
FIG. 4-9 are a top plan views of additional exemplary embodiments of a cargo strap fastener according to the teachings of the present disclosure.

FIGS. 3A-3D are a sequence of views illustrating how the cargo strap fastener 10 can be used to tie down a loose end of a webbing strap according to the teachings of the present disclosure. The strap is typically used with hooks 24 and 25 and a ratcheting mechanism 26 to facilitate tightly securing cargo or articles to a platform or truck bed, for example. Assume for example in FIG. 3A that the webbing strap has already been strapped around cargo loaded onto a truck bed using the hooks, for example, and tension is applied using the ratcheting mechanism 26 to tighten the cargo strap securely around the cargo. The loose tail end 22 of the cargo strap, is passed through the central slot 14 and most of the length pulled through. The loose end of the strap is then wound or wrapped around the sides C and D of the fastener 10, using it like a spool. When most of the strap has been wrapped around the fastener over the elongated wrap section, one slot 13 of the fastener 10 is then slipped over or clipped onto the loose end 22 of the strap so that the entire width of the strap is accommodated in the slot 13, as shown in FIG. 3B. The slot 13 is then also clipped to the tensioned portion 28 of the strap, as shown in FIG. 3C. The other slot 12 is then clipped to the tensioned portion 28 of the strap, as shown in FIGS. 3C and 3D. The loose tail end of the strap 22 is thus held and secured by a tensioned segment 30 of the strap that is clipped to the fastener 10 as shown in FIG. 3D. In this way, the cargo fastener 10 secures the loose end 22 of the strap to the rest of the strap in a neat and elegant manner. The cargo fastener 10 is not bulky and therefore does not take up space and is almost hidden by the strap.

FIGS. 4-8B are a top plan views of additional exemplary embodiments of the cargo strap fastener according to the teachings of the present disclosure. In the embodiment 40 shown in FIG. 4, the rectangular or elongated wrap section 42 is defined by sides A and B that preferably curve inwardly (concave) towards one another for better retention of the loose end of the cargo strap during use and for economy of material and/or weight in manufacturing the fastener. Sides C and D of the fastener also preferably curve inwardly (concave) for economy of material and/or weight and for a more ergonomic profile. The fastener incorporates slots 44 and 45 defining the rectangular or elongated fasten section 46 and for fastening to the strap. The slot openings are further defined by "lips" that provide a thicker and narrower profile to the entrances of the slots 44 and 45. The "lips" help retain the tensioned section of the cargo strap within the slots 44 and 45 during use. The fastener 40 also incorporates a third central slot 48 located near the center of the device and configured to receive the loose end of the cargo strap wrapped around the rectangular elongated wrap section 42 of the device.

In operation, the loose tail end of the cargo strap is first threaded through the center slot 48 and then the loose segment of the strap is wrapped around the fastener 40 about the rectangular wrap section 42. The tensioned segment of the strap is then clipped into the slots 44 and 45 to hold and secure the tail end of the cargo strap. The elongated wrap section 42 and elongated fasten section 46 of this embodiment are in a crosswise configuration.

Figure 5:
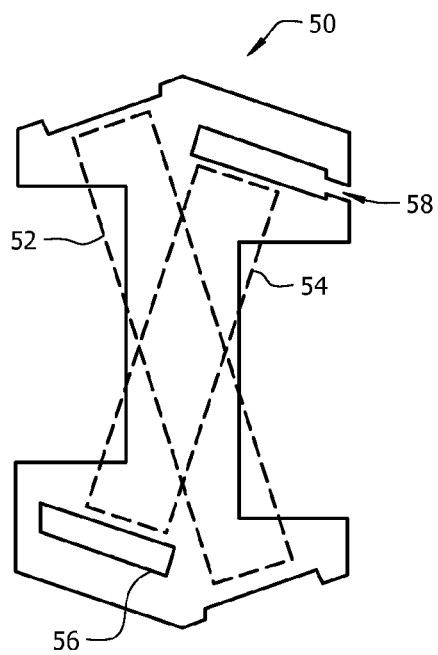

FIG. 5 is a top plan view of yet another exemplary embodiment of the cargo strap fastener 50 according to the present disclosure. The outline of the fastener 50 helps to define an elongated wrap section 52, and the fastener 50 further incorporates one opening 56 and one slot 58 to define an elongated fasten section 54. Other features include cutout regions and double notches in the configuration of the slot for better retention of the strap. The elongated wrap section and elongated fasten section of this embodiment are also in a crosswise configuration. The outline of the fastener 50 is preferably economized to eliminate excessive material and weight while still maintaining the integrity of the structure. In this embodiment, the tail end of the strap is first inserted in the opening 56, and the loose segment of the strap is wrapped about the elongated wrap section 52. The fastener 50 is then clipped onto the tensioned segment of the strap via the slot 58, also securing the tail end to the tensioned segment of the strap. Alternately, the fastener 50 can form an integral part of the ratchet device and cargo strap system where the strap is threaded through the opening 56 of the fastener.

Figure 6:
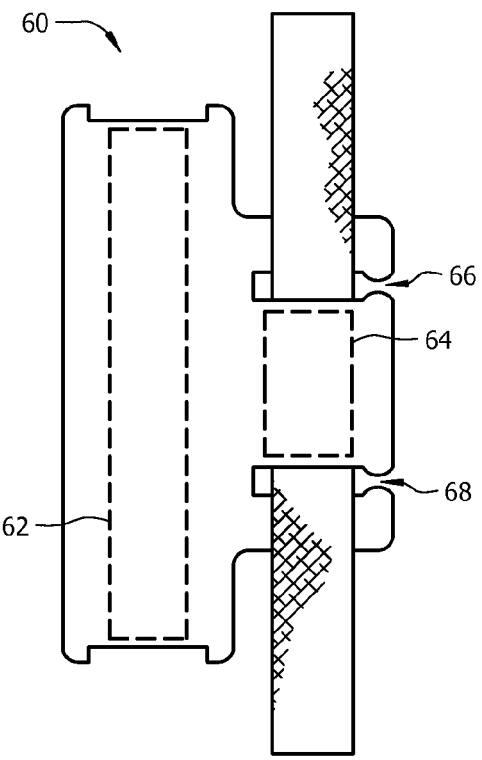

FIG. 6 shows a fastener 60 that defines an elongated wrap section 62 and an elongated fasten section 64 that are generally parallel with one another. The fastener 60 includes slots 66 and 68 used to clip into the tensioned segment of the cargo strap, which is used to hold down the tail end of the strap after the loose segment has been wrapped about the elongated wrap section.

Figure 7:
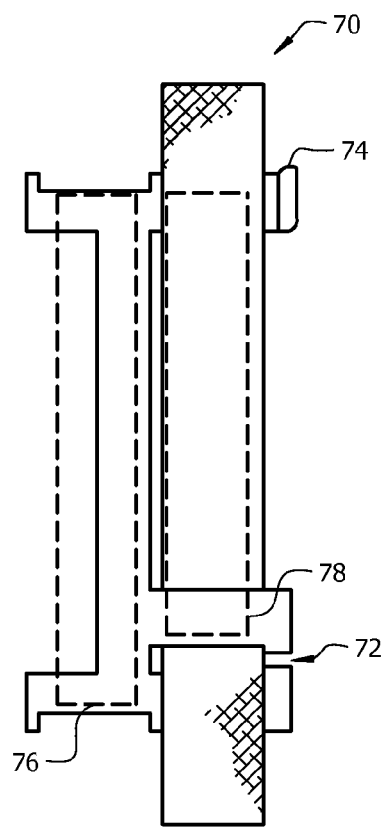

FIG. 7 shows an embodiment of the fastener 70 in which a slot 72 is employed at one end while a contoured strap guide 74 is employed at the other end to retain the tensioned segment of the strap. The fastener 70 includes a generally rectangular or elongated wrap section 76, and a parallel generally rectangular or elongated fasten section 78. In this embodiments, the loose segment of the strap is wrapped in a parallel configuration with respect to the tensioned segment of the strap. In the embodiments shown in FIGS. 6 and 7, the rectangular elongated wrap section and rectangular elongated fasten section formed by the slots and the parallel sides are generally in a parallel configuration.

Figure 8A:
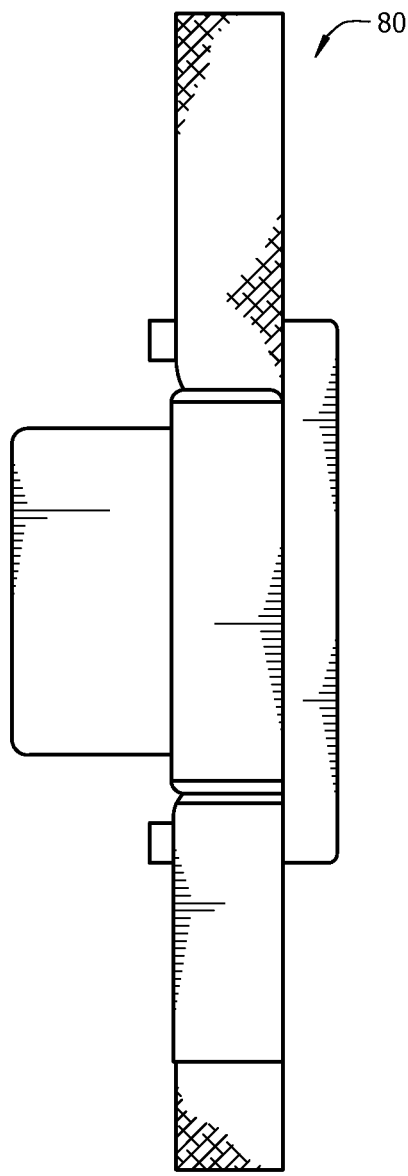
Figure 8B:
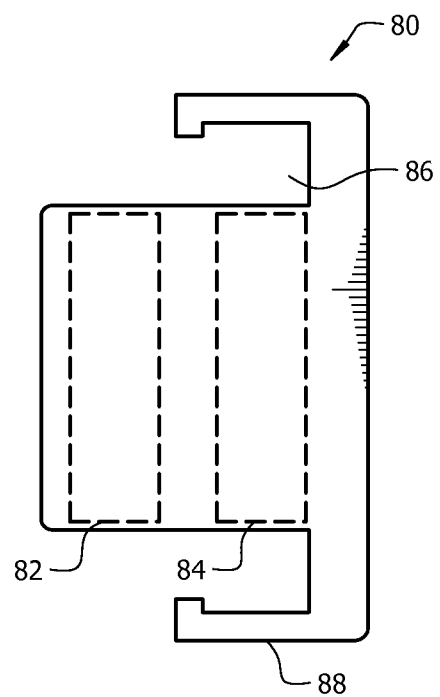

FIGS. 8A and 8B are further views of yet another exemplary embodiment of the cargo strap fastener 80 according to the present disclosure. In this embodiment, the rectangular elongated wrap section 82 and rectangular elongated fasten section 84 formed by the slots 86 and 88 are generally in a parallel configuration. In operation, the loose end of the cargo strap is wrapped around the fastener device in the area shown as the rectangular wrap section 82, then the wrapped strap can be moved or slid to overlap the rectangular fasten section 84, and the tensioned segment of the strap is clipped into the slots 86 and 88 to hold and secure the cargo strap.

Figure 9:
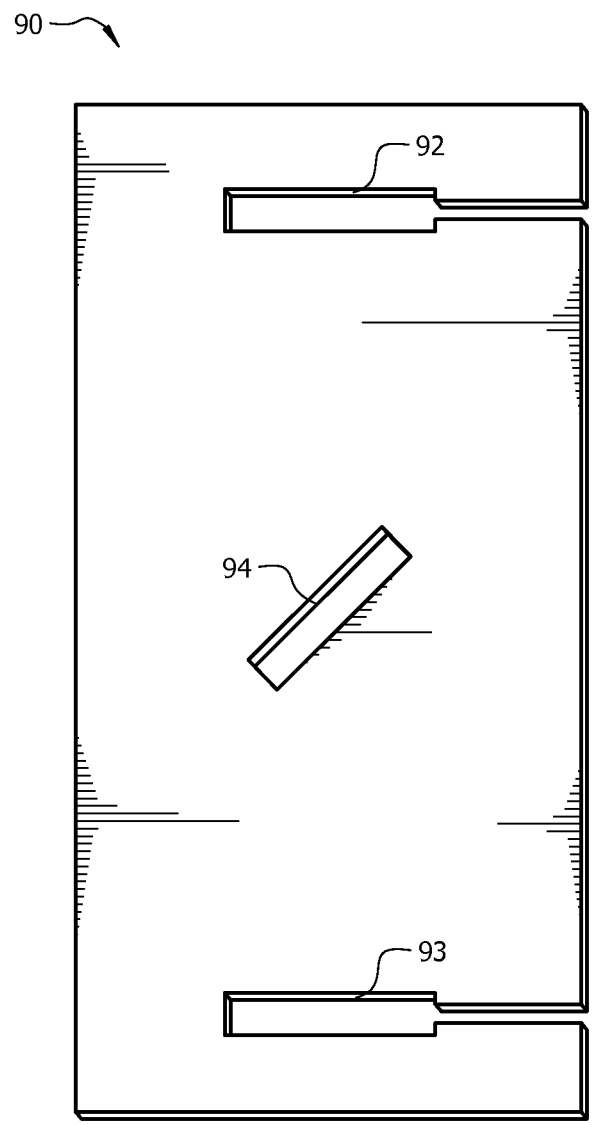

FIG. 9 is a top plan view of yet a further exemplary embodiment of the cargo strap fastener 90. The cargo strap fastener 90 is generally rectangular in shape with two narrow slots 92 and 93 along the same side of the fastener. A central opening 94 is defined in the device for receiving a loose end of the webbing strap to initiate the wrapping of the strap around the device.

The cargo strap fastener device of the present disclosure enables a user to take the excess strap, wrap it around a portion of the fastener device, and secure it by hooking or clipping the device back on the tensioned strap. The fastener is adapted to fasten the excess and the loose end of the strap down for safe transit to avoid the loose end whipping around in the wind, damaging adjacent articles, and becoming a trip hazard. This fastening devices saves time and frustration by preventing tangled webbing and avoid having to undo unmanageable knots at the end of the journey. Simply wrap the strap around the device and clip it back onto the tensioned strap to tidy up and secure the loose end.

The dimensions of the fastener, the depth of the slots, and other dimensional aspects of the fastener should be designed with the width and thickness of the webbing or strap in mind. Although the fastener is preferably used with flat webbing straps, it may be used with other types of rope, cord, cable, line, etc.

The cargo strap fastener and all variants described herein use the tension (even if extremely light) of the main cargo strap to create friction and hold the fastener in place along the loose end of the strap. There are many possible variations available using the above concepts. For example, all designs have employed two slots for sliding over the tensioned strap, but really only a single slot or opening is necessary to achieve the necessary friction, provided there is a way to secure the device parallel to the strap. It is possible and may end up being necessary for a single slot and single enclosed hole, instead of two slots for liability and security reasons. This would require the strap to run through the device prior to tightening, but it also means it cannot come loose and fly off a vehicle going 80 MPH. All the concepts and features described herein can be interchanged with the other designs. In general, the cargo strap fastener have some or all of the following desirable features: Fast on/fast off operation, strong enough to work with 1,000 lbs. strap tension (many straps are rated to this weight or more) and not be permanently deformed or damaged, not detach from strap even at very high speeds, not damage or weaken strap because of inventions use, retain slack end of strap even at very high speeds in all orientations and angles, high abrasion resistance, high Flexural strength, high impact strength, high impact resistance, high shear strength, can be used as a roll-up device after tensioned use, won't damage nearby equipment in case of accidental contact, lightweight, inexpensive, and stackable or nestable for ease of storage and economy in shipment.

The features of the present invention which are believed to be novel are set forth below with particularity in the appended claims. However, modifications, variations, and changes to the exemplary embodiments described above will be apparent to those skilled in the art, and the fastener device described herein thus encompasses such modifications, variations, and changes and are not limited to the specific embodiments described herein.

What is claimed is:

1. A fastener operable to fasten to a strap and retain a loose end of the strap, comprises:
  a generally planar body having a longitudinal axis, two elongated edges and two shortened edges, the generally planar body defining a substantially elongated central slit dimensioned to accommodate the strap;

a first narrow slot defined proximate a first end of the generally planar body;

the first narrow slot having a predetermined width and length dimensioned to accommodate the strap, and having a thickened profile defining lips at an opening to the first narrow slot configured to retain the strap in the slot;

a second narrow slot defined proximate a second end of the generally planar body, the second narrow slot generally being parallel to the first narrow slot; and the second narrow slot having a predetermined width and length dimensioned to accommodate the strap, and having a thickened profile defining lips at an opening to the second narrow slot configured to retain the strap in the narrow slot; and the first narrow slot is defined in one of the elongated edges proximate the first end, and the second narrow slot is defined in an opposite elongated edge proximate the second end.

2. The strap fastener of claim 1, wherein the first narrow slot is defined in one of the elongated edges proximate the first end, and the second narrow slot is defined in the same elongated edge proximate the second end.

3. The strap fastener of claim 1, wherein the first and second narrow slots each having a width and further comprises an opening more narrow than the width of the narrow slot configured to better retain the strap in the narrow slots.

4. The strap fastener of claim 1, wherein the planar body further defines an opening disposed near one end of the generally planar body.

5. The strap fastener of claim 1, wherein the planar body further defines first and second circular openings disposed proximate first and second ends of the generally planar body.

6. The strap fastener of claim 1, wherein the two shortened edges of the generally planar body have a generally concave profile.

7. The strap fastener of claim 1, wherein the two elongated edges of the generally planar body have a generally concave profile.

8. The strap fastener of claim 1, wherein an outline of the generally planar body comprises curvilinear lines.

9. A fastener operable to fasten to a strap, comprises:

a generally planar body having a longitudinal axis, two elongated edges and two shortened edges, the generally planar body defining a substantially elongated central slit dimensioned to accommodate the strap therethrough;

a first narrow slot defined proximate a first end of the generally planar body;

the first narrow slot having a predetermined width and length dimensioned to accommodate the strap, and having a thickened profile defining lips at an opening to the first narrow slot configured to retain the strap in the first narrow slot;

a second narrow slot defined proximate a second end of the generally planar body, the second narrow slot generally being parallel to the first narrow slot;

the second narrow slot having a predetermined width and length dimensioned to accommodate the strap, and having a thickened profile defining lips at an opening to the second narrow slot configured to retain the strap in the second narrow slot; and the first and second narrow slots further defining a fasten region generally along the longitudinal axis of the planar body, the first and second narrow slots configured to clip onto a tensioned segment of the strap, the general planar body further defining a wrap region generally in a crosswise relationship with respect to the fasten region, the wrap region being configured for having the strap wrapped around it.

10. The strap fastener of claim 9, wherein the first narrow slot is defined in one of the elongated edges proximate the first end, and the second narrow slot is defined in an opposite elongated edge proximate the second end.

11. The strap fastener of claim 9, wherein the first narrow slot is defined in one of the elongated edges proximate the first end, and the second narrow slot is defined in the same elongated edge proximate the second end.

12. The strap fastener of claim 9, wherein the fasten region is generally in a substantially parallel relationship with respect to the wrap region.

13. The strap fastener of claim 9, wherein the first and second narrow slots further comprises openings more narrow than widths of the narrow slots configured to better retain the strap in the slots.

14. The strap fastener of claim 9, wherein the planar body further defining first and second circular openings disposed proximate first and second ends of the generally planar body.

15. The strap fastener of claim 9, wherein the two shortened edges of the generally planar body have a generally concave profile.

16. The strap fastener of claim 9, wherein the two elongated edges of the generally planar body have a generally concave profile.

17. The strap fastener of claim 9, wherein an outline of the generally planar body comprises curvilinear lines.

18. A device operable to fasten an elongated loose segment of a strap, comprises:

an elongated body having a longitudinal axis, two elongated edges and two shortened edges, the elongated body defining a substantially elongated slit disposed in a center of the elongated body and dimensioned to accommodate the elongated loose segment of the strap therethrough;

a first narrow slot defined in one of the elongated edges proximate a first end of the elongated body;

the first narrow slot having a predetermined width and length dimensioned to accommodate the strap, and having a thickened and narrowed profile at an opening defining lips to the first narrow slot configured to retain the strap in the first narrow slot;

a second narrow slot defined in an opposite elongated edge proximate a second end of the elongated body, the second narrow slot generally being parallel to the first narrow slot;

the second narrow slot having a predetermined width and length dimensioned to accommodate the strap, and having a thickened and narrowed profile at an opening defining lips to the second narrow slot configured to retain the strap in the second narrow slot; and the first and second narrow slots further defining a fasten region generally along the longitudinal axis of the elongated body, the first and second narrow slots configured to clip onto and retain the device against a tensioned segment of the strap, the elongated body further defining a wrap region generally in a crosswise relationship with respect to the fasten region, the wrap region being configured for having the strap wrapped around it.

\* \* \* \* \*